(12) United States Patent  
Kan

(10) Patent No.: US 8,549,054 B2  
(45) Date of Patent: Oct. 1, 2013

(54) ARITHMETIC PROCESSING APPARATUS AND ARITHMETIC PROCESSING METHOD

(75) Inventor: Ryuji Kan, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1224 days.

(21) Appl. No.: 12/230,029

(22) Filed: Aug. 21, 2008

(65) Prior Publication Data

US 2008/0320065 A1 Dec. 25, 2008

Related U.S. Application Data

(63) Continuation of application No. PCT/JP2006/303441, filed on Feb. 24, 2006.

(51) Int. Cl.  
*G06F 7/00* (2006.01)  
*G06F 7/42* (2006.01)

(52) U.S. Cl.  
USPC .......................... 708/201; 708/501; 708/505

(58) Field of Classification Search  
USPC .......................................... 708/201, 501, 505  
See application file for complete search history.

(56) References Cited

U.S. PATENT DOCUMENTS 5,251,164 A 10/1993 Dodson et al.  
5,867,413 A * 2/1999 Yeh ................................ 708/501  
6,061,707 A * 5/2000 Dibrino et al. ................. 708/505  
7,490,119 B2 * 2/2009 Dhong et al. .................. 708/505  
2002/0133525 A1 9/2002 Chen et al.

FOREIGN PATENT DOCUMENTS

| JP | 2-310620 | 12/1990 |
| JP | 3-8018 | 1/1991 |
| JP | 7-508603 | 9/1995 |
| JP | 2000-155671 | 6/2000 |
| JP | 2003-196079 | 7/2003 |

OTHER PUBLICATIONS

Japanese Office Action issued Apr. 5, 2010 in corresponding Japanese Patent Application 2008-501539.  
International Search Report for PCT/JP2006/303441, mailed May 30, 2006.

* cited by examiner

*Primary Examiner* — Chuong D Ngo  
(74) *Attorney, Agent, or Firm* — Staas & Halsey LLP

(57) ABSTRACT

In an arithmetic processing apparatus, a dividing unit divides a second bit string into a low-order bit part having a bit width equal to a first bit width and a high-order bit part which is higher than the low-order bit part, a first arithmetic unit performs arithmetic operations for a carry to and a borrow from the high-order bit part; and a second arithmetic unit performs addition of absolute values of the low-order bit part and the first bit string. Finally, a selecting unit selects an output of the first arithmetic unit from among an arithmetic operation result with a carry, an arithmetic operation result with a borrow, and the high-order bit part itself, according to information about the high-order bit part, sign information of the first bit string and the second bit string, and an intermediate result of the addition of the absolute values by the second arithmetic unit.

18 Claims, 3 Drawing Sheets

FIG.4

| SIGN | SIGN OF A | SIGN OF B | CO_1 | AH_0 | CO_0 | SH | SL |
|---|---|---|---|---|---|---|---|
| SAME | + | + | | | 0 | Z | z |
| SAME | + | + | | | 1 | X | z |
| DIFFERENT | - | + | 0 | | | Z | y |
| DIFFERENT | - | + | 1 | 0 | 0 | Z | y |
| DIFFERENT | - | + | 1 | 0 | 1 | Y | y |
| DIFFERENT | - | + | 1 | 1 | | Z | x |
| DIFFERENT | + | - | 0 | 0 | | Y | x |
| DIFFERENT | + | - | 0 | 1 | | Z | y |
| DIFFERENT | + | - | 1 | | | Z | x |

ARITHMETIC PROCESSING APPARATUS AND ARITHMETIC PROCESSING METHOD

CROSS REFERENCE TO RELATED APPLICATIONS

This is a continuing application, filed under 35 U.S.C. §111(a), of International Application PCT/JP2006/303441, filed Feb. 24, 2006, the contents of which are incorporated herein by reference.

BACKGROUND OF THE INVENTION

1. Field of the Invention

The present invention relates to arithmetic processing apparatuses and arithmetic processing methods for performing an addition operation of the absolute values of two bit strings having different bit widths.

2. Description of the Related Art

Typical arithmetic operations in a processor, such as a computer, use floating-point numbers, which can represent a wider range of magnitudes using a limited number of bits. A floating-point number is composed of a sign part, an exponent part, and a mantissa part. Arithmetic operations on floating-point numbers involve frequent additions of the absolute values of the exponent part and the mantissa part.

A typical arithmetic processing apparatus includes two adders to perform addition and subtraction operations of two binary numbers A and B. One of the two adders has a carry-in of 0 serving as a third input, and if the binary numbers A and B have the same positive/negative sign, the output of this adder indicates the result of an arithmetic operation. On the contrary, if the binary numbers A and B have different positive/negative signs and the result of the addition is negative, then the output of this adder is inverted to produce the absolute value, which indicates the result of the arithmetic operation.

The other adder has a carry-in of 1 serving as a third input and performs subtraction based on complement representation of number 2. Therefore, if the binary numbers A and B have different positive/negative signs and the result of the addition is positive, the output of this adder indicates the result of the arithmetic operation.

Because floating-point arithmetic apparatuses that include such arithmetic processing apparatuses tend to include larger circuits and consume more power, various structures are being investigated in order to reduce circuit size by, for example, adding an inverter or modifying shift operations. A related art can be found in Japanese Patent Application Laid-open No. 2000-155671.

However, if two binary numbers A and B have different bit widths (i.e., numbers of digits), addition and subtraction operations of such numbers by using an adder pose a problem in that the processing time can be reduced only to a limited extent; because 0s are appended to the higher-bit end of the number with the smaller bit width when performing addition and subtraction operations. For example, if the binary number A has a larger bit width than the binary number B, 0s are appended to the higher-bit end of the binary number B so that both the numbers have the same bit width.

Thus, adders must have a configuration that can handle a binary number with the larger bit width among the binary numbers with differing bit widths. This leads to increase in the overall circuit size of the adders. In addition, arithmetic operations are performed on all bits, including the high-order bits of a binary number with smaller bit width among the binary numbers with differing bit widths even though those high-order bits are all 0s. This leads to extending the processing time.

SUMMARY

It is an object of the present invention to at least partially solve the problems in the conventional technology.

According to an aspect of the present invention, there is provided an arithmetic processing apparatus for performing addition of absolute values of a first bit string having a first bit width and a second bit string having a second bit width larger than the first bit width. The arithmetic processing apparatus includes a dividing unit that divides the second bit string into a low-order bit part having a bit width equal to the first bit width and a high-order bit part which is higher than the low-order bit part; a first arithmetic unit that performs arithmetic operations for a carry to and a borrow from the high-order bit part; a second arithmetic unit that performs addition of absolute values of the low-order bit part and the first bit string; and a selecting unit that selects an output of the first arithmetic unit from among an arithmetic operation result with a carry, an arithmetic operation result with a borrow, and the high-order bit part itself, according to information about the high-order bit part, sign information of the first bit string and the second bit string, and an intermediate result of the addition of the absolute values by the second arithmetic unit.

According to another aspect of the present invention, there is provided an arithmetic processing method of performing addition of absolute values of a first bit string having a first bit width and a second bit string having a second bit width larger than the first bit width. The arithmetic processing method includes dividing the second bit string into a low-order bit part having a bit width equal to the first bit width and a high-order bit part which is higher than the low-order bit part; performing first arithmetic operations for a carry to and a borrow from the high-order bit part; performing second arithmetic operations of adding absolute values of the low-order bit part and the first bit string; and selecting an output of the first arithmetic operation from among an arithmetic operation result with a carry, an arithmetic operation result with a borrow, and the high-order bit part itself, according to information about the high-order bit part, sign information of the first bit string and the second bit string, and an intermediate result of the addition of the absolute values by the second arithmetic operation.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a diagram depicting selection of arithmetic results of the absolute-value adding section.

DETAILED DESCRIPTION OF THE PREFERRED EMBODIMENTS

Exemplary embodiments of the present invention will now be described in detail with reference to the drawings.

Although the following description is given by way of example of addition and subtraction operations on the mantissa parts of floating-point numbers, the present invention is not limited only to floating-point numbers but can also be applied to addition operations of various types of absolute values.

Figure 1:
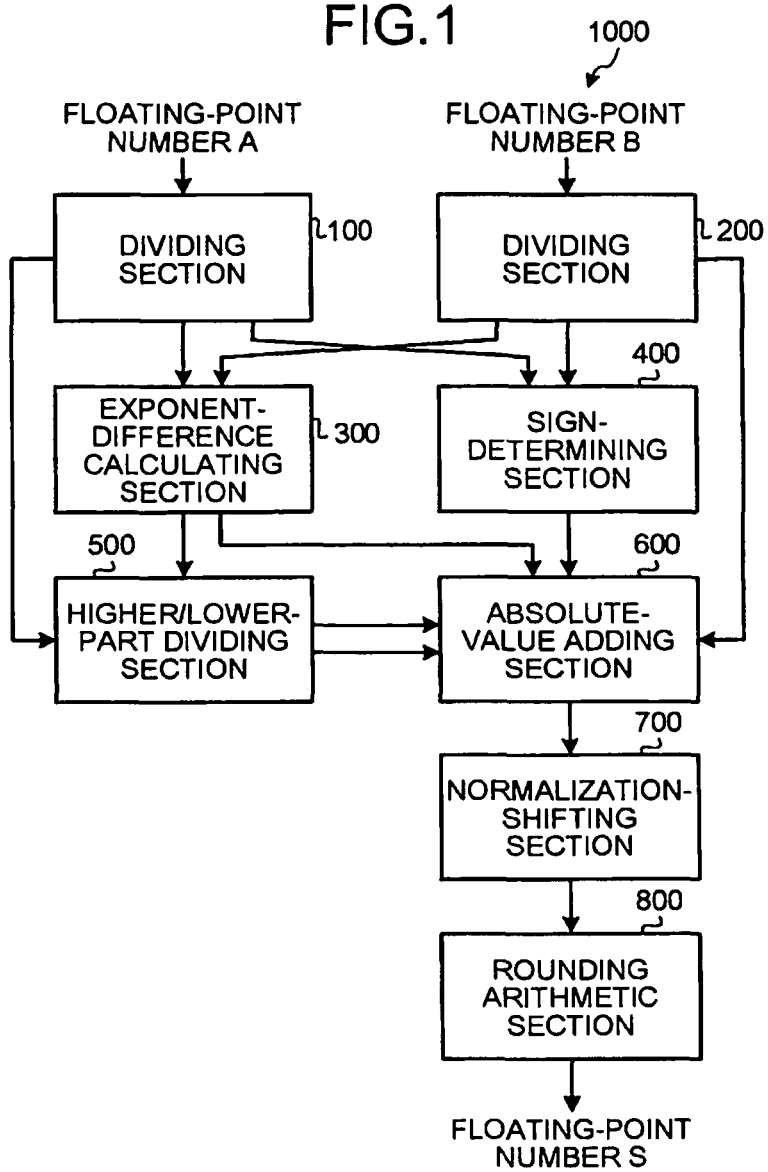
FIG. 1 is a block diagram of a floating-point arithmetic apparatus according to one embodiment of the present invention.

FIG. 1 is a block diagram of a floating-point arithmetic apparatus 1000 according to one embodiment of the present invention. The floating-point arithmetic apparatus 1000 includes a dividing section 100, a dividing section 200, an exponent-difference calculating section 300, a sign-determining section 400, a higher/lower-part dividing section 500, an absolute-value adding section 600, a normalization-shifting section 700, and a rounding arithmetic section 800.

Figure 2:
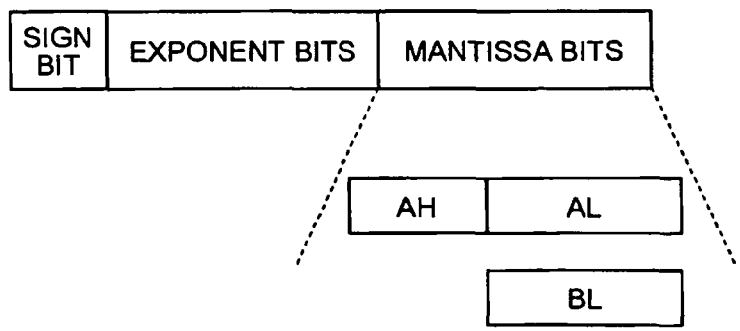
FIG. 2 is a diagram depicting an example of a floating-point number.

A floating-point number A is input into the dividing section 100. The dividing section 100 divides the floating-point number A into, as shown in FIG. 2, a sign bit indicating whether the floating-point number A is positive or negative, exponent bits corresponding to the number of digits of the floating-point number A, and mantissa bits corresponding to the value of the floating-point number A. The dividing section 100 outputs the sign bit to the sign-determining section 400, outputs the exponent bits to the exponent-difference calculating section 300, and outputs the mantissa bits to the higher/lower-part dividing section 500.

A floating-point number B is input into the dividing section 200. The dividing section 200 divides a floating-point number B into, as shown in FIG. 2, a sign bit indicating whether the floating-point number B is positive or negative, exponent bits corresponding to the number of digits of the floating-point number B, and mantissa bits corresponding to the value of the floating-point number B. The dividing section 200 outputs the sign bit to the sign-determining section 400, outputs the exponent bits to the exponent-difference calculating section 300, and outputs the mantissa bits to the absolute-value adding section 600.

The exponent-difference calculating section 300 compares the exponent bits between the floating-point numbers A and B, informs the higher/lower-part dividing section 500 about the difference in exponent between the floating-point numbers A and B, and outputs, to the absolute-value adding section 600, high-order bit information AH_0 indicating whether high-order bits AH in the mantissa bits of the floating-point number A is 0. The high-order bits AH correspond to the difference in the number of digits between the floating-point numbers A and B. The high-order bit information AH_0 is a signal indicating 1 if the high-order bits AH are 0 and 0 if the high-order bits AH are not 0.

The sign-determining section 400 compares the sign bits between the floating-point numbers A and B to determine whether the floating-point numbers A and B have the same or different signs and outputs the result of determination, as well as sign information containing the sign of each of the floating-point numbers A and B, to the absolute-value adding section 600.

In response to the notification from the exponent-difference calculating section 300, the higher/lower-part dividing section 500 applies scaling-shift operations to the mantissa bits of the floating-point number A and the mantissa bits of the floating-point number B to divide the mantissa bits of the floating-point number A into the high-order bits AH corresponding to the difference in the number of digits and low-order bits AL equivalent to the number of digits in the mantissa bits of the floating-point number B. In other words, because scaling the floating-point number A and the floating-point number B may cause the bit widths of the mantissa bits to differ between the floating-point numbers A and B, the higher/lower-part dividing section 500 divides the mantissa bits of the floating-point number A into the high-order bits AH and the low-order bits AL, as shown in, for example, FIG. 2, so that the bit width of the low-order bits AL is equivalent to the bit width of mantissa bits BL of the floating-point number B.

The absolute-value adding section 600 performs addition of the low-order bits AL of the floating-point number A and the mantissa bits BL of the floating-point number B, performs arithmetic operations separately for a carry to and a borrow from the high-order bits AH of the floating-point number A, and eventually selects an arithmetic result SH of the high-order bit part and an arithmetic result SL of the low-order bit part according to the high-order bit information AH_0, the sign information, and so on. Specific arithmetic operations performed by the absolute-value adding section 600 will be described later in detail.

The normalization-shifting section 700 performs normalization-shifting to determine the exponent bits appropriately so that a bit string composed of the arithmetic result SH and the arithmetic result SL produced by the absolute-value adding section 600 defines the mantissa bits of a floating-point number.

The rounding arithmetic section 800 performs a rounding arithmetic operation on the bit string composed of the arithmetic result SH and the arithmetic result SL produced by the absolute-value adding section 600 and sets the result as the mantissa bits of the floating-point number. By doing so, the rounding arithmetic section 800 outputs a floating-point number S that is the result of an addition of the floating-point numbers A and B.

Figure 3:
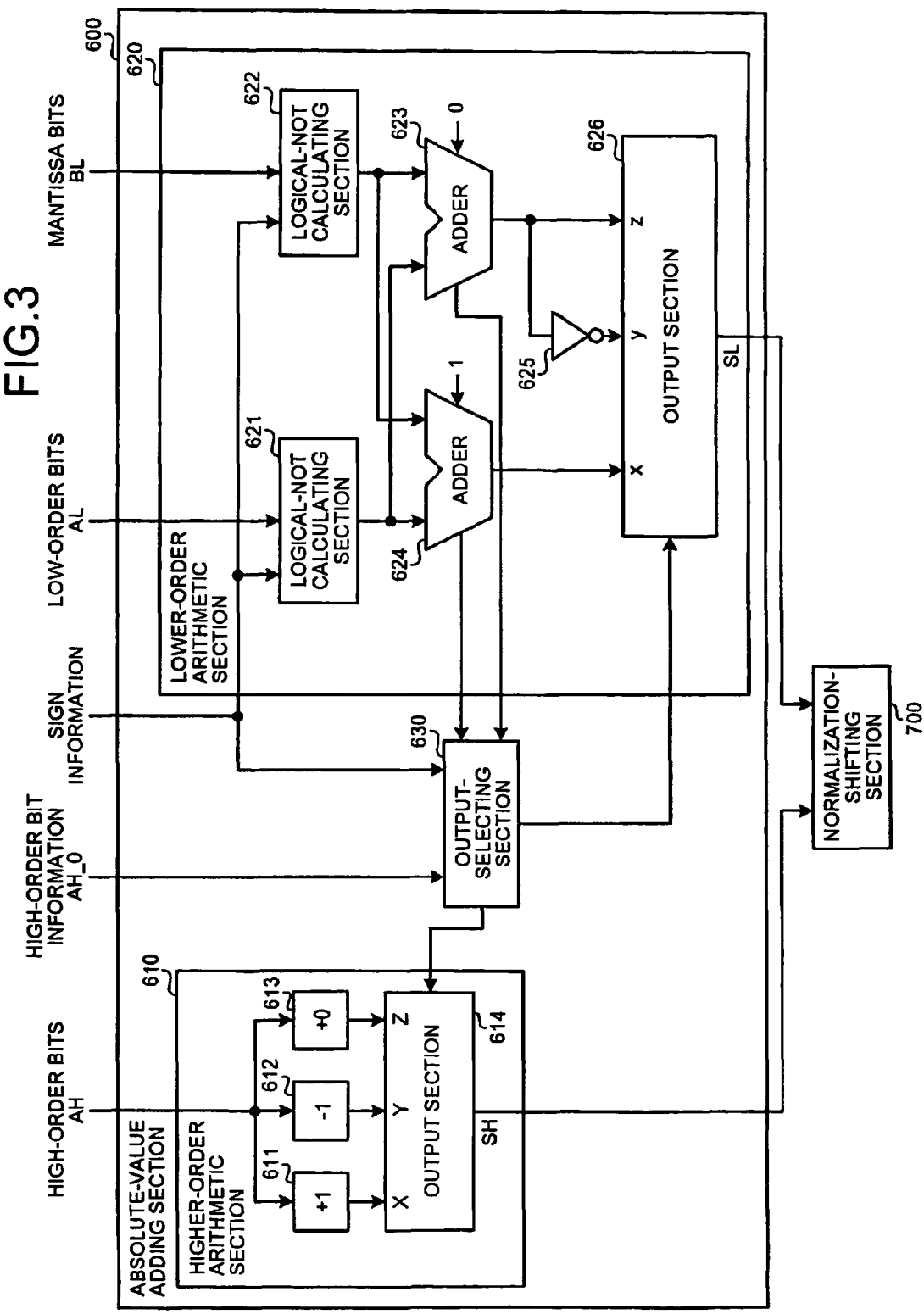
FIG. 3 is a block diagram of an absolute-value adding section shown in FIG. 1.

FIG. 3 is a block diagram of the absolute-value adding section 600. The absolute-value adding section 600 includes a higher-order arithmetic section 610, a lower-order arithmetic section 620, and an output-selecting section 630. The higher-order arithmetic section 610 includes a +1 arithmetic unit 611, a −1 arithmetic unit 612, a +0 arithmetic unit 613, and an output section 614. The lower-order arithmetic section 620 includes a logical-NOT calculating section 621, a logical-NOT calculating section 622, an adder 623, an adder 624, an inverter 625, and an output section 626.

The higher-order arithmetic section 610 performs arithmetic operations for a carry to and a borrow from the high-order bits AH and outputs, as the arithmetic result SH of the high-order bits, one of the result of the high-order bits AH being carried, the result of the high-order bits AH being borrowed, and the high-order bits AH themselves, according to the high-order bit information AH_0, the sign information, and intermediate results of arithmetic operations on the low-order bits in the lower-order arithmetic section 620.

More specifically, the +1 arithmetic unit 611 adds +1, corresponding to a carry from the arithmetic result of the low-order bits to the high-order bits AH, and inputs the result of the addition as an input X to the output section 614. The −1 arithmetic unit 612 adds −1, corresponding to a borrow from the arithmetic result of the low-order bits to the high-order bits AH, and inputs the result of the addition as an input Y to the output section 614. The +0 arithmetic unit 613 inputs the high-order bits AH themselves as an input Z to the output section 614 in case neither a carry nor a borrow is generated from the arithmetic result of the low-order bits. The output section 614 outputs one of X, Y, and Z as the arithmetic result SH of the high-order bits according to a command from the output-selecting section 630.

The lower-order arithmetic section 620 performs an addition or a subtraction between the low-order bits AL and the mantissa bits BL and outputs the arithmetic result SL of the low-order bits according to the high-order bit information AH_0, the sign information, and the intermediate result of the addition or subtraction.

More specifically, if it is determined that the floating-point numbers A and B have different signs and that the floating-point number A has a negative value based on the sign information, the logical-NOT calculating section 621 calculates the logical NOT of the low-order bits AL and outputs the result to the adder 623 and the adder 624. On the other hand, if it is determined that the floating-point numbers A and B have the same sign or that the floating-point number A has a positive value based on the sign information, the logical-NOT calculating section 621 outputs the low-order bits AL as-is to the adders 623 and 624. Similarly, if it is determined that the floating-point numbers A and B have different signs and that the floating-point number B has a negative value based on the sign information, the logical-NOT calculating section 622 calculates the logical NOT of the mantissa bits BL and outputs the result to the adders 623 and 624. Furthermore, if it is determined that the floating-point numbers A and B have the same sign or that the floating-point number B has a positive value based on the sign information, the logical-NOT calculating section 622 outputs the mantissa bits BL as-is to the adders 623 and 624.

An addition operation of a negative value (i.e., a subtraction operation) in binary numbers can be converted into an addition operation of a positive value using Equation (1) based on complement representation of number 2:

$$-P = !P + 1 \quad (1)$$

where P indicates a desired binary number and !P indicates the logical NOT of P.

Therefore, if any one of the floating-point numbers A and B has a negative value, the logical-NOT calculating section 621 or the logical-NOT calculating section 622 calculates the logical NOT of the low-order bits AL or the mantissa bits BL in advance.

The adder 623 has an input of 0 as a carry-in to the least-significant bit, adds the output from the logical-NOT calculating section 621 and the output from the logical-NOT calculating section 622 with the carry-in of 0, and outputs the result of the addition as an input z to the output section 626. Therefore, z=AL(or !AL)+BL(or !BL). In addition, the adder 623 outputs a carry-out CO_0 in the addition process to the output-selecting section 630.

The adder 624 has an input of 1 as a carry-in to the least-significant bit, adds the output from the logical-NOT calculating section 621 and the output from the logical-NOT calculating section 622 with the carry-in of 1, and outputs the result of the addition as an input x to the output section 626. Therefore, x=AL(or !AL)+BL(or !BL)+1. The carry-in of 1 in the adder 624 corresponds to +1 on the right-hand side of Equation (1). Therefore, if the adder 624 performs the arithmetic operation, for example, AL+!BL+1, it means that the arithmetic operation AL−BL is performed (only if the result is a positive value, however). Furthermore, the adder 624 outputs a carry-out CO_1 in the addition process to the output-selecting section 630.

The inverter 625 inverts the result of addition by the adder 623 and outputs the logical NOT as an input y to the output section 626. Therefore, y=!(AL(or !AL)+BL(or !BL)). If the result of the arithmetic operation, for example, AL−BL is a negative value, −(AL−BL) is needed as the result of addition of the absolute values. Using Equation (1), −(AL−BL) can be converted as shown in Equation (2):

$$\begin{aligned} -(AL - BL) &= -(AL + !BL + 1) \quad (2) \\ &= -(AL + !BL) - 1 \\ &= !(AL + !BL) + 1 - 1 \\ &= !(AL + !BL) \end{aligned}$$

In short, the inverter 625 is provided to obtain !(AL+!BL) or !(!AL+BL) as a variant of −(AL−BL). According to a command from the output-selecting section 630, the output section 626 outputs one of the inputs x, y, and z as the arithmetic result SL of the low-order bits.

Based on the high-order bit information AH_0, the sign information, the carry-out CO_0, and the carry-out CO_1, the output-selecting section 630 selects the arithmetic result SH in the higher-order arithmetic section 610 from among the inputs X, Y, and Z to the output section 614 and selects the arithmetic result SL in the lower-order arithmetic section 620 from among the inputs x, y, and z to the output section 626. More specifically, the output-selecting section 630 selects the arithmetic result SH and the arithmetic result SL according to the table shown in FIG. 4. In the table of FIG. 4, cells with a diagonal line can have a value of 0 or 1.

The carry-out CO_1 in FIG. 4 indicates the positive or negative sign of the result of addition by the adder 624. In more detail, if the result of addition by the adder 624 is equal to or larger than 0, a carry occurs in the adder 624; that is, the carry-out CO_1 becomes 1. If the result of addition by the adder 624 is negative, no carry occurs in the adder 624; that is, the carry-out CO_1 becomes 0.

The high-order bit information AH_0 in FIG. 4 indicates whether the high-order bits AH are 0. More specifically, if the value of the exponent bits of the floating-point numbers A and B are same and the number of digits of the floating-point number A is equal to or smaller than the number of digits of the floating-point number B, then the high-order bits AH become 0 and the high-order bit information AH_0 becomes 1. On the other hand, if the number of digits of the floating-point number A is larger than the number of digits of the floating-point number B, then the high-order bits AH are not 0 and the high-order bit information AH_0 becomes 0.

The carry-out CO_0 in FIG. 4 indicates whether a carry occurs in the result of addition by the adder 623. More specifically, the carry-out CO_0 becomes 1 if a carry occurs in the adder 623, and the carry-out CO_0 becomes 0 if no carry occurs in the adder 623.

FIG. 4 describes three types of arithmetic operations: A+B (including −A−B), −A+B, and A−B. In the arithmetic operation A+B, it is determined whether to retain the high-order bits AH as-is or to add 1 as a carry depending on whether a carry occurs as a result of an arithmetic operation between the low-order bits AL and the mantissa bits BL. More specifically, if no carry occurs in addition between the low-order bits AL and the mantissa bits BL, the high-order bits AH are retained as-is. If a carry occurs in addition between the low-order bits AL and the mantissa bits BL, 1 is added to the high-order bits AH.

In the arithmetic operations −A+B and A−B, it is determined whether to retain the high-order bits AH as-is or to add −1 as a borrow depending on the magnitude relationship between the low-order bits AL and the mantissa bits BL and whether the high-order bits AH are 0. More specifically, if the low-order bits AL are smaller than the mantissa bits BL (AL<BL) and the high-order bits AH are not 0, then a borrow from the high-order bits AH occurs in the process of subtracting the mantissa bits BL from the low-order bits AL, and therefore, −1 is added to the high-order bits. If the low-order bits AL are equal to or larger than the mantissa bits BL (AL≥BL) or the high-order bits AH are 0, then no borrow occurs from the high-order bits AH in the process of subtracting the mantissa bits BL from the low-order bits AL, and therefore, the high-order bits AH are retained as-is.

In the table of FIG. 4, if the floating-point numbers A and B have the same sign (i.e., A+B), the absolute-value adding section 600 can perform an addition normally. Therefore, the result of addition from the adder 623 with a carry-in of 0 is selected for the low-order bits. In short, the arithmetic result SL of the low-order bits is represented by the input z of the output section 626. If no carry occurs in the addition process by the adder 623, the carry-out CO_0 is 0 and the output from the +0 arithmetic unit 613 is selected for the high-order bits. In short, the arithmetic result SH of the high-order bits is represented by the input Z of the output section 614. On the other hand, if a carry occurs in the addition process by the adder 623, the carry-out CO_0 is 1 and the output from the +1 arithmetic unit 611 is selected for the high-order bits. In short, the arithmetic result SH of the high-order bits is represented by the input X of the output section 614.

Next, if the floating-point number A is a negative value and the floating-point number B is a positive value (i.e., −A+B), the arithmetic operation −AL+BL is performed for the low-order bits. In this case, because the floating-point number A is negative, the logical NOT of the low-order bits AL, that is, !AL is output from the logical-NOT calculating section 621. As a result, the inputs x, y, and z of the output section 626 are represented as in Equation (3) through arithmetic operations by the adder 623, the adder 624, and the inverter 625:

$$x = !AL + BL + 1$$

$$y = !(!AL + BL)$$

$$z = !AL + BL \quad (3)$$

If the carry-out CO_1 of the adder 624 is 0, it indicates that −AL+BL is negative, and the result of addition of the absolute values is −(−AL+BL). Hence, like Equation (2), −(−AL+BL) is converted as shown in Equation (4):

$$-(-AL + BL) = !(!AL + BL) \quad (4)$$

The result of Equation (4) is equal to the input y in Equation (3), and thus the arithmetic result SL of the low-order bits is represented by the input y of the output section 626. In this case, because −AL+BL is negative, the relationship AL>BL holds. As a result, no borrow occurs from the high-order bits AH, and hence the arithmetic result SH of the high-order bits is represented by the input Z of the output section 614.

On the other hand, if the carry-out CO_1 of the adder 624 is 1, −AL+BL is equal to or larger than 0. Paying attention particularly to a case where the carry-out CO_0 of the adder 623 is 0, no carry occurs in the addition process by the adder 623 (z in Equation (3)), whereas a carry occurs in the addition process by the adder 624 (x in Equation (3)). Because this indicates that the carry results from a carry-in of 1 in the adder 624, the result of addition, !AL+BL (=z), in the adder 623 is found to be a bit string whose bits are all 1s. In other words, the logical NOT of the low-order bits AL, that is !AL, and the mantissa bits BL have a logical-NOT relationship with each other, which indicates that the low-order bits AL are equal to the mantissa bits BL. For this reason, the arithmetic result SL (=−AL+BL) of the low-order bits is 0, and hence the input y, which is generated by inverting, with the inverter 625, the result of addition by the adder 623 whose bits are all 1s, is selected. In this case, because −AL+BL is 0, no borrow occurs from the high-order bits AH, and the arithmetic result SH of the high-order bits is represented by the input Z of the output section 614.

In a case where the carry-out CO_1 of the adder 624 is 1 and the carry-out CO_0 of the adder 623 is 1, −AL+BL is positive, and therefore, the relationship AL<BL holds. This may cause a borrow to occur from the high-order bits AH. More specifically, if the high-order bits AH are not 0, that is, if the high-order bit information AH_0 is 0, then a borrow occurs. Despite a positive result of −AL+BL, if a borrow occurs from the high-order bits AH, the borrow causes the low-order bits AL to become substantially larger than the mantissa bits BL. For this reason, the arithmetic operation in this case is performed in the same manner as in a case where −AL+BL is negative. Therefore, the arithmetic result SL of the low-order bits is represented by the input y of the output section 626. In this case, because a borrow occurs from the high-order bits AH, the arithmetic result SH of the high-order bits is represented by the input Y of the output section 614.

Furthermore, if the high-order bits AH are 0, that is, if the high-order bit information AH_0 is 1, it indicates that the number of digits of the floating-point number A is equal to or smaller than the number of digits of the floating-point number B, and hence, no borrow occurs. If no borrow occurs, −AL+BL is positive, and hence it is sufficient to perform the subtraction of BL−AL simply. Therefore, the arithmetic result SL of the low-order bits is represented by the input x of the output section 626. In this case, because no borrow occurs from the high-order bits AH, the arithmetic result SH of the high-order bits is represented by the input Z of the output section 614.

Next, if the floating-point number A has a positive value and the floating-point number B has a negative value (i.e., A−B), then the arithmetic operation AL−BL is performed for the low-order bits. In this case, because the floating-point number B is negative, the logical NOT of the mantissa bits BL, that is, !BL, is output from the logical-NOT calculating section 622. As a result, the inputs x, y, and z of the output section 626 are represented as in Equation (5) below through arithmetic operations by the adder 623, the adder 624, and the inverter 625.

$$x = AL + !BL + 1$$

$$y = !(AL + !BL)$$

$$z = AL + !BL \quad (5)$$

If the carry-out CO_1 of the adder 624 is 1, it indicates that AL−BL is equal to or larger than 0, and it is sufficient to simply perform the subtraction of AL−BL. Therefore, the arithmetic result SL of the low-order bits is represented by the input x of the output section 626. In this case, because AL−BL is positive, the relationship AL>BL holds. As a result, no borrow occurs from the high-order bits AH, and hence the arithmetic result SH of the high-order bits is represented by the input Z of the output section 614.

On the other hand, if the carry-out CO_1 of the adder 624 is 0, it indicates that AL−BL is negative, and the relationship AL<BL holds. This may cause a borrow to occur from the high-order bits AH. More specifically, if the high-order bits AH are not 0, that is, if the high-order bit information AH_0 is 0, then a borrow occurs. Despite a negative result of AL−BL, if a borrow occurs from the high-order bits AH, the borrow substantially causes the low-order bits AL to become larger than the mantissa bits BL. For this reason, the arithmetic operation in this case is performed in the same manner as in a case where AL−BL is equal to or larger than 0. Therefore, the arithmetic result SL of the low-order bits is represented by the input x of the output section 626. In this case, because a borrow occurs from the high-order bits AH, the arithmetic result SH of the high-order bits is represented by the input Y of the output section 614.

Furthermore, if the high-order bits AH are 0, that is, if the high-order bit information AH_0 is 1, then it indicates that the number of digits of the floating-point number A is equal to or smaller than the number of digits of floating-point number B, and no borrow occurs. If no borrow occurs, AL−BL is negative, and hence, the result of addition of the absolute values becomes −(AL−BL). From Equation (2), this is found to be equal to the input y in Equation (5). Therefore, the arithmetic result SL of the low-order bits is represented by the input y of the output section 626. In this case, because no borrow occurs from the high-order bits AH, the arithmetic result SH of the high-order bits is represented by the input Z of the output section 614.

As described above, the output-selecting section 630 selects the arithmetic result SH from the output section 614 and the arithmetic result SL from the output section 626 by referring to the table shown in FIG. 4, thereby obtaining a result of addition of the absolute values of the floating-point number A and the floating-point number B. For this purpose, as a result of dividing arithmetic operations on the high-order bits AH into arithmetic operations on the low-order bits AL and arithmetic operations on the mantissa bits BL, the structure of the adders 623 and 624 be made sufficiently simple, as long as they can handle the bit widths of the low-order bits AL and the mantissa bits BL. In addition, a circuit that is required in the conventional art for adding 0 as to the high-order bits AH can be eliminated. Moreover, a circuit provided for arithmetic operations on the high-order bits AH in this embodiment has such a simple structure that the circuit size of the absolute-value adding section 600 can be reduced.

Furthermore, for the high-order bits AH, arithmetic operations are performed in advance for a case where a carry occurs, a case where a borrow occurs, and a case where neither a carry nor a borrow occurs, so that the appropriate arithmetic result SH of the high-order bits is selected in the process of arithmetic operations by the lower-order arithmetic section 620. For this reason, once arithmetic operations on the low-order bits AL and the mantissa bits BL by the lower-order arithmetic section 620 are completed, it is not necessary to perform arithmetic operations on the high-order bits AH separately. Because of this, addition of the absolute values of the mantissa bits of the floating-point numbers A and B is completed substantially in a period of time required for an arithmetic operation on a bit width smaller than that of the mantissa bits of the floating-point number A.

As described above, according to this embodiment, when an arithmetic operation of two numbers with different bit widths is to be performed, the number having a larger bit width is divided into high-order bits and low-order bits, and an arithmetic operation is performed in advance for the high-order bits, allowing for a carry and a borrow resulting from an arithmetic operation on the low-order bits, so that an appropriate arithmetic result of the high-order bits is selected in the process of the arithmetic operation on the low-order bits. Therefore, to complete the necessary arithmetic operations, it takes only a period of time required for the arithmetic operation on the low-order bits. This leads to reduction in the processing time and circuit size.

According to an aspect of the present invention, when an arithmetic operation of two numbers with different bit widths is to be performed, it is sufficient only to select an appropriate arithmetic result for the high-order bit part once an arithmetic operation on the low-order bit part has been completed. This allows all arithmetic operations to be completed substantially within the period of time required for an arithmetic operation on the low-order bit part, contributing to a further reduction in the processing time. Furthermore, because it is not necessary to provide a circuit for an addition operation on the high-order bit part, circuit size can be reduced.

Moreover, a correct arithmetic operation can be performed even though the bit width of a second bit string is substantially equal to or smaller than the bit width of a first bit string.

In addition, whether there is a carry resulting from an addition operation of positive values can be reflected in the arithmetic result for the high-order bit part.

Furthermore, whether there is a carry resulting from an addition operation of the low-order bit part and the first bit string can be correctly reflected in the arithmetic result for the high-order bit part.

In addition, whether there is a borrow resulting from an addition operation of a positive value and a negative value can be reflected in the arithmetic result for the high-order bit part.

In addition, if the bit width of the second bit string is substantially equal to or smaller than the bit width of the first bit string, the arithmetic result for the high-order bit part can be retained as 0 so that the result of addition of the absolute values can be obtained by subtracting the low-order bit part from the first bit string.

Furthermore, a borrow generated in the process of subtracting the first bit string from the low-order bit part can be correctly reflected in the arithmetic result for the high-order bit part.

In addition, the absence of a borrow in the process of subtracting the first bit string from the low-order bit part can be correctly reflected in the arithmetic result for the high-order bit part.

Furthermore, the circuit structure for obtaining the arithmetic result for the high-order bit part can be simplified, thus ensuring a reduction in circuit size.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An arithmetic processing apparatus for performing addition of absolute values of a first bit string having a first bit width and a second bit string having a second bit width larger than the first bit width, the arithmetic processing apparatus comprising:
 a dividing unit that divides the second bit string into a low-order bit part having a bit width equal to the first bit width and a high-order bit part which is higher than the low-order bit part;
 a first arithmetic unit that performs arithmetic operations for a carry to and a borrow from the high-order bit part;
 a second arithmetic unit that performs addition of absolute values of the low-order bit part and the first bit string; and
 a selecting unit that selects an output of the first arithmetic unit from among an arithmetic operation result with a carry, an arithmetic operation result with a borrow, and the high-order bit part itself, according to information about the high-order bit part, sign information of the first bit string and the second bit string, and an intermediate result of the addition of the absolute values by the second arithmetic unit.

2. The arithmetic processing apparatus according to claim 1, wherein the selecting unit selects the output of the first arithmetic unit depending on whether the high-order bit part is 0.

3. The arithmetic processing apparatus according to claim 1, wherein the selecting unit selects the arithmetic operation result with the carry or the high-order bit part itself if the signs of the first bit string and the second bit string are the same.

4. The arithmetic processing apparatus according to claim 3, wherein the selecting unit selects the arithmetic operation result with the carry if a carry occurs in the addition of the absolute values by the second arithmetic unit or selects the high-order bit part itself if no carry occurs in the addition of the absolute values by the second arithmetic unit.

5. The arithmetic processing apparatus according to claim 1, wherein the selecting unit selects the arithmetic operation result with the borrow or the high-order bit part itself if the signs of the first bit string and the second bit string are different.

6. The arithmetic processing apparatus according to claim 5, wherein the selecting unit selects the high-order bit part itself if the high-order bit part is 0.

7. The arithmetic processing apparatus according to claim 5, wherein the selecting unit selects the arithmetic operation result with the borrow if the high-order bit part is not 0 and the low-order bit part is smaller than the first bit string.

8. The arithmetic processing apparatus according to claim 5, wherein the selecting unit selects the high-order bit part itself if the low-order bit part is equal to or larger than the first bit string.

9. The arithmetic processing apparatus according to claim 1, wherein the first arithmetic unit includes
- a first arithmetic operator that adds 1, corresponding to a carry, to the high-order bit part;
- a second arithmetic operator that subtracts 1, corresponding to a borrow, from the high-order bit part;
- a third arithmetic operator that adds 0 to the high-order bit part; and
- an output unit that outputs one of the operation results of the first arithmetic operator, the second arithmetic operator, and the third arithmetic operator according to the output selected by the selecting unit.

10. An arithmetic processing method executed by a processor performing addition of absolute values of a first bit string having a first bit width and a second bit string having a second bit width larger than the first bit width, the arithmetic processing method comprising:
- dividing, by using a dividing unit included in the processor, the second bit string into a low-order bit part having a bit width equal to the first bit width and a high-order bit part which is higher than the low-order bit part;
- performing, by using a first arithmetic unit included in the processor, first arithmetic operations for a carry to and a borrow from the high-order bit part;
- performing, by using a second arithmetic unit included in the processor, second arithmetic operations of adding absolute values of the low-order bit part and the first bit string; and
- selecting, by using a selector included in the processor, an output of the first arithmetic operation from among an arithmetic operation result with a carry, an arithmetic operation result with a borrow, and the high-order bit part itself, according to information about the high-order bit part, sign information of the first bit string and the second bit string, and an intermediate result of the addition of the absolute values by the second arithmetic operation.

11. The arithmetic processing method according to claim 10, wherein the selecting includes selecting the output of the first arithmetic operation depending on whether the high-order bit part is 0.

12. The arithmetic processing method according to claim 10, wherein the selecting includes selecting the arithmetic operation result with the carry or the high-order bit part itself if the signs of the first bit string and the second bit string are the same.

13. The arithmetic processing method according to claim 12, wherein the selecting includes selecting the arithmetic operation result with the carry if a carry occurs in the addition of the absolute values by the second arithmetic operation or selecting the high-order bit part itself if no carry occurs in the addition of the absolute values by the second arithmetic operation.

14. The arithmetic processing method according to claim 10, wherein the selecting includes selecting the arithmetic operation result with the borrow or the high-order bit part itself if the signs of the first bit string and the second bit string are different.

15. The arithmetic processing method according to claim 14, wherein the selecting includes selecting the high-order bit part itself if the high-order bit part is 0.

16. The arithmetic processing method according to claim 14, wherein the selecting includes selecting the arithmetic operation result with the borrow if the high-order bit part is not 0 and the low-order bit part is smaller than the first bit string.

17. The arithmetic processing method according to claim 14, wherein the selecting includes selecting the high-order bit part itself if the low-order bit part is equal to or larger than the first bit string.

18. The arithmetic processing method according to claim 10, wherein the first arithmetic operation includes
- adding 1, corresponding to a carry, to the high-order bit part;
- subtracting 1, corresponding to a borrow, from the high-order bit part;
- adding 0 to the high-order bit part; and
- outputting one of the operation results of the adding 1, the subtracting 1, and the adding 0 according to the output selected at the selecting.

* * * * *